March 11, 1958    V. E. CAMERON ET AL    2,825,975
MEASURING DEVICE
Filed June 1, 1955
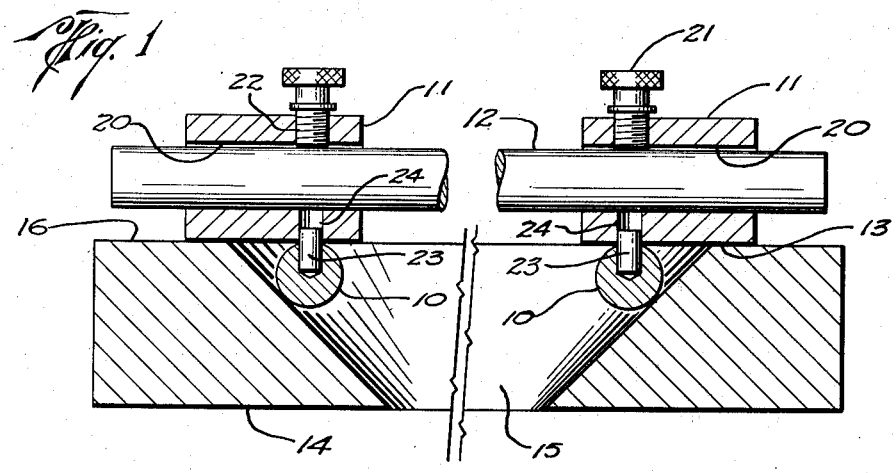
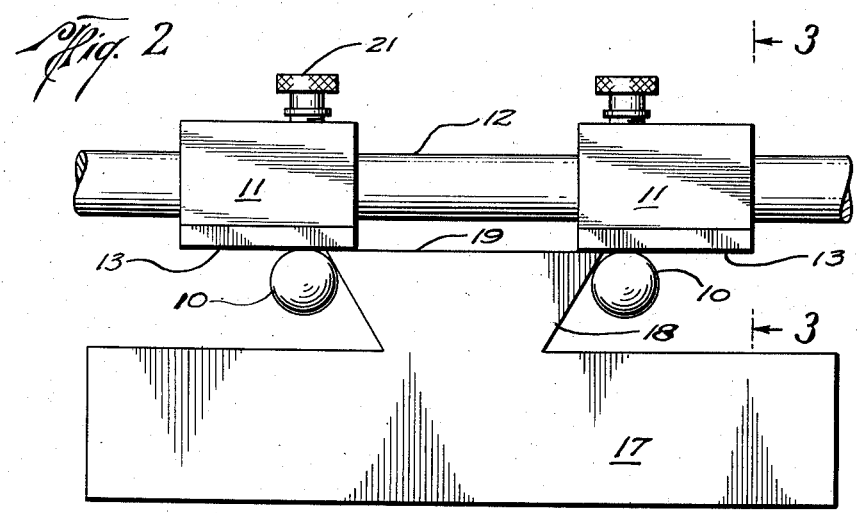
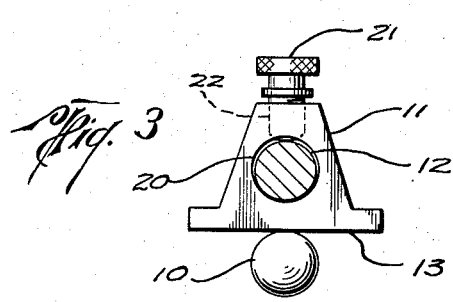
Victor E. Cameron
Jerry G. Vallade
INVENTORS
BY
ATTORNEYS United States Patent Office 2,825,975
Patented Mar. 11, 1958

2,825,975

MEASURING DEVICE

Victor E. Cameron and Jerry G. Vallade, Houston, Tex.

Application June 1, 1955, Serial No. 512,514

11 Claims. (Cl. 33—174)

This invention relates to an improved device for measuring across the intersection of a taper with a flat surface of an object.

There are many machining operations requiring close tolerances which cannot be gauged by conventional measuring devices, such as micrometers. Examples of these are tapered holes or recesses, or what might be termed "internal tapers," and tapered pins and dovetail slides, which might be termed "external tapers."

When, as is common practice, a taper intersects a flat surface of the object or workpiece and is symmetrical therewith, cylindrical rods or spherical balls of equal size have been used to gauge the distance desired. Thus, with the angular relation of the taper to the flat surface of the object being determinable and the gauging balls resting tangentially upon a surface parallel to the flat surface, the balls may be moved into tangential engagement with opposite sides of the taper and the distance across the outside of the balls measured by a micrometer or the like. The distance across the intersection of the taper with the flat surface of the object may then be calculated by a formula such as is given on page 1128 of the 1951 edition of Machinery's Handbook.

The accuracy of measurements of this type is dependent upon the balls having a common plane of tangency parallel to the flat surface of the object or workpiece. Prior attempts at providing an integrated measuring device of this type have not been entirely satisfactory inasmuch as they have been of complicated construction and the above-noted parallelism has depended upon the maintenance of a large number of tolerances. More particularly, they have failed to provide a suitable connection for selectively retracting and extending the gauging balls relative to one another, while at the same time maintaining such parallelism.

An object of this invention is to provide a measuring device of this type which is operable with an assurance of accuracy not heretofore possible with similar devices of the prior art.

Another object is to provide a measuring device of this type constructed of a minimum number of parts; and wherein such parts are readily replaceable and interchangeable for purposes of repair.

Still another object is to provide a measuring device of this type in which the connection between the gauging balls requires the maintenance of only one tolerance.

A further object is to provide a single integrated and portable measuring device for measuring across both internal and external tapers.

A still further object is to provide a novel connection for the balls which enables them to be quickly and accurately disposed against opposite sides of the taper in proper parallelism to the flat surface of the object.

Yet a further object is to provide a measuring device of this type in which the gauging balls are so attached to the connection therefor as to permit their position to be easily adjusted for changing the point of tangency thereof adapted to abut the taper.

In the drawings:

Fig. 1 is a longitudinal sectional view of an illustrative measuring device constructed in accordance with this invention and in position for measuring across an internal taper;

Fig. 2 is an elevational view of the device in position for measuring across an external taper; and Fig. 3 is an end view of the device removed from the object being measured and taken along broken line 3—3 of Fig. 2.

Referring now particularly to the drawings, the measuring device of this invention includes a pair of spheres or balls 10 of equal size attached to blocks 11 and connected together for extension and contraction relative to one another by a rod 12. More particularly, each ball is tangentially attached to a flat surface 13 of its respective block, and the blocks are carried on the rod in a manner to dispose their flat surfaces in the same plane. Thus, with the flat surfaces of the blocks resting upon and parallel to a flat surface of the object or workpiece which is intersected by a taper symmetrical to such flat surface of the object, the balls define a common plane of tangency parallel to the flat surface of the object.

Referring first to Fig. 1, there is shown an object 14 having a hole 15 therein defined by a taper which intersects a flat surface 16 of the object, and is symmetrical thereof in the sense that it is angularly disposed thereto an equal amount entirely around the hole. This then is an internal taper in which the balls 10 are tangentially engaged with opposite inner sides of the taper for measuring the diameter thereacross.

On the other hand, the object 17 shown in Fig. 2 is provided with a dovetail 18 defined by a taper which intersects a flat surface 19 of the object. In this case, the flat surface 19 is the upper portion of the dovetail 18 and the taper is symmetrical thereto in the sense that it is angularly disposed thereto an equal amount at opposite sides. This object illustrates an external taper wherein the balls 10 are tangentially engaged with opposite outer sides of the taper for measuring purposes.

At least one of the blocks 11 of the device is movable longitudinally of the rod 12 and relative to the other block 11 such that the balls 10 may be extended or retracted relative to one another. Thus, in measuring across the intersection of the internal taper of Fig. 1 with the flat surface 16, the balls 10 would be retracted with respect to one another to permit them to be freely disposed within the hole 15 and the flat surfaces 13 of blocks 11 to be rested upon and disposed parallel to the flat surface 16. At this time, the blocks 11 are moved to extend the balls relative to one another into tangentially abutting relation with opposite sides of the taper. In a manner which will be obvious to those skilled in the art, the device may then be manipulated to insure that the balls are finally caused to engage with the taper across a diameter of the hole 15.

Upon locking of the blocks 11 relative to one another, the measuring device may be removed from the workpiece and a measurment taken by a micrometer or like instrument across the outer extremities of the balls. With this dimension, and further with the angle of the taper and the diameter of the balls being determinable, the desired distance across the intersection of the taper with the flat surface 16 may be computed by the following formula:

$h = x + d \, (\cot \theta/2 - 1)$, wherein $h$ = the distance desired, $x$ = the dimension across the outer extremities of the balls, $d$ = the diameter of the balls, and $\theta$ = the acute angle which the taper makes with the flat surface of the object.

In measuring across the intersection of the external taper of Fig. 2 with the flat surface 19, the balls 10 are first extended with respect to one another so as to permit them to be placed freely at opposite sides of the taper and the flat surfaces 13 of the blocks 11 to be rested upon the flat surface 19 in parallel relation thereto. At this time, the blocks 11 are moved to retract the balls with respect to one another such that they are brought into tangential engagement with the outer surfaces of the external taper. As in the case of measuring the internal taper, the device may be manipulated in a manner to insure that their points of tangency define a line across the dovetail which is perpendicular to the opposite tapered sides thereof. In other words, as distinguished from the case of the internal taper wherein it was desired to obtain the maximum dimension or diameter across the taper, the object in the case of measuring the external taper is to determine the minimum dimension thereacross. Having obtained this dimension, however, the desired distance across the intersection of the taper with the flat surface of the object may be obtained by the following formula:

$h = x - d (\cot \theta/2 + 1)$, wherein
$h$ = the distance desired,
$x$ = the dimension across the outer extremities of the balls,
$d$ = the diameter of the balls, and
$\theta$ = the obtuse angle which the taper makes with the flat surface 19 of the object.

The above formulas are merely for purposes of illustration and are in no way limiting upon the concepts of this invention. It will be readily understood that other formulas employing different trigonometric functions may be employed if desired.

Turning now to certain novel concepts of this invention, one or both of the blocks 11 are carried by the rod 12 for rotation thereabout as well as movement longitudinally with respect thereto. For this purpose, the rod 12 is cylindrical and the block 11 is provided with a similarly shaped opening 20 therethrough for accommodating the rod and having its axis parallel to surface 13. In this respect, it will be noted that the rod is rather loosely received within the opening 20 through the block 11, thus permitting easy manipulation of the block with respect to the rod when unlocked, and also eliminating the necessity for close tolerances.

This arrangement of the block and rod enables the flat surfaces 13 of the blocks to be quickly and easily disposed in coplanar relation to one another. At the same time, this construction requires only one close tolerance, which is the distance between the flat surface 13 of the block and the lower portion of opening 20 which is tangent to a plane parallel to the flat surface 13. For this purpose, the flat surface 13 is preferably made of specially hardened metal. Also, any wear of opening 20 will tend to be symmetrical of a perpendicular to the above-mentioned parallel planes. Thus, this part of the connection reduces considerably the possibility of error in measurement due to lack of parallelism between the flat surfaces 13 and the flat surface of the object, which would in turn effect the parallelism of such flat surface of the object and a common plane of tangency for balls 10.

By comparison, earlier devices have employed grooved connections for permitting the longitudinal movement of the blocks on the rod. It is obvious that such connections are susceptible to warpage of one or the other parts and thus require very close observation as to tolerances.

The blocks 11 are releasably locked in place along and about the rod 12 by means of thumbscrews 21 threadedly received in taped openings 22 which connect the upper end of the blocks opposite flat surfaces 13 with the openings 20 through the blocks. As best shown in Fig. 3, the opening 22 is disposed perpendicularly to the flat surface 13 and the inner end of the screw 21 bears upon rod 12 along its axis to cause the lower portion of the rod to tangentially bear against opening 20 along a point in a plane parallel to the flat surface 13. In this manner, it is assured that upon locking of the blocks the flat surface 13 of one block will be disposed in the above-mentioned coplanar relation to the flat surface of the other block and also parallel to the flat surface 16 of the object of workpiece.

It is preferred that both blocks 11 be of the same construction such that they are interchangeable one with another, and further since this construction facilitates the use of a straight rod 12 made of conventional bar stock. Obviously, the rod 12 is thus readily replaceable apart from the interchangeable block parts 11. This arrangement is of considerable importance from the standpoint of repair and upkeep of the device as a whole, in addition to its value from the standpoint of fabrication and assembly.

As previously mentioned, the balls 10 are tangentially attached to the flat surface 13 of the blocks 11 such that, with the balls being of equal size, a plane commonly tangential to both balls is parallel to the plane of the flat surfaces 13 in the operative position of the device. Furthermore, the balls are attached to the blocks 11 in such a manner that the flat surface 13 surrounds and is contiguous with the attachment, whereby the device is operable for measuring both internal and external tapers. This means of attachment comprises a pin 23 imbedded radially in the ball at one end and having its opposite end received in an opening 24 in flat surface 13 of the block in a manner to obtain the tangential relationship aforementioned. Particularly, the pins 23 are sufficiently slender so that they do not interfere with the measurement of the tapers. This feature can be best appreciated in connection with Fig. 2 wherein a corner of dovetail 18 extends inwardly of the space defined between the ball 10 and flat surface 13 of the block 11.

According to another novel concept of this invention, the pins 23 are cylindrical and are received within a similarly shaped opening 24 such that the balls 10 may be rotated about the axis of the pin for changing the point on the ball adapted to tangentially abut with the taper to be measured. More particularly, the opening 24 is disposed with its axis perpendicular to the flat surface 13 of the block so that the required parallelism of the plane commonly tangential to the balls with respect to the flat surface of the object will be maintained regardless of the degree to which the balls are rotated in changing their point of abutment with the taper. Obviously, the reason for such adjustment is to prevent any one point on the balls from wearing down and thus lessening the degree of accuracy of the measurements.

Still further, the openings 24 connect the flat surface 13 with opening 20 such that the pins 23 may be press-fitted within the openings 24 for providing a secure fit therein during operation of the device, but at the same time may be punched out by any suitable tool extended through opening 22. Thus, as can be seen from the drawings, the connection of opening 22 with opening 20 is substantially opposite the connection of opening 24 therewith.

The method of using this device should be apparent from the foregoing description. In summary, one or both of set screws 21 are loosened to permit the balls 10 to be retracted or extended as desired, and the device is placed over the taper to be measured. The blocks 11 are then placed with their surfaces 13 flat and parallel to the object surface 16 or 19, as the case may be. With the engaging surfaces held in this parallel relation, the balls are extended or retracted into abutment with opposite sides of the taper and manipulated back and forth to make sure that a maximum or minimum dimension, again as the case may be, is being taken. The screws are then tightened to lock the blocks and balls in place and the device removed from the taper to permit measurement across the outer extremities of the balls. In the case of the internal taper of Fig. 1, the device need only be lifted from the hole 15, while in the case of the external taper of Fig. 2, the device is carefully slipped lengthwise from the dovetail 18.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for measuring across the intersection of a taper with a flat surface of an object, comprising a cylindrical rod, a pair of blocks on the rod, each of said blocks having a flat surface with a ball tangentially attached thereto of a size equal to the ball attached to the other block, one of said blocks being rotatable about the rod for disposing its flat surface in the same plane as the flat surface of the other block and movable relatively to said other block for bringing both balls into tangential engagement with opposite sides of the taper when the flat surfaces of the blocks are resting upon the flat surface of the object, and means for locking said one block in position on the rod with its flat surface coplanar with the flat surface of the other block.

2. A device for measuring across the intersection of a taper with a flat surface of an object, comprising a cylindrical rod, a pair of blocks on the rod, each of said blocks having a flat surface with a ball tangentially attached thereto of a size equal to the ball attached to the other block, and one of said blocks being slidable longitudinally of and rotatable about the rod, and means for locking said last-mentioned block in position on the rod with its flat surface coplanar with the flat surface of the other block.

3. A device for measuring across the intersection of a taper with a flat surface of an object, comprising a cylindrical rod, a pair of blocks received about the rod for rotational as well as longitudinal movement relative thereto, each block having a flat surface disposable in coplanar relation with the flat surface of the other block, a ball tangentially attached to the flat surface of each block and being of a size equal to the ball attached to the other block, and means for locking each of said blocks against movement relative to the rod.

4. As a subcombination, a body having a flat surface on one side, a cylindrical opening extending through the body with its axial parallel to the plane of said flat surface, a tapped opening in the body connecting the side thereof opposite its flat surface with said cylindrical opening and extending substantially transversely to the plane of said flat surface, a set screw threadedly received in said tapped opening, and a ball tangentially attached to said flat surface.

5. A device for measuring across the intersection of a taper with a flat surface of an object, comprising a rod, a pair of blocks on the rod, at least one of said blocks being movable longitudinally of the rod, and a ball tangentially attached to a surface of each of said blocks and being of a size equal to the ball attached to the other block, said surface of each block having a flat portion surrounding and contiguous to the attachment of the ball thereto, for disposal upon a flat surface of an object either intermediate or at opposite sides of the intersection of the taper therewith and in coplanar relation with the flat portion of said surface of the other block when similarly disposed.

6. A device for measuring across the intersection of a taper with a flat surface of an object, comprising a rod, a pair of blocks on the rod, each of said blocks having a flat surface disposable in coplanar relation to the flat surface of the other block, and a ball attached to the flat surface of each block in tangential relation thereto and being of a size equal to the ball attached to the other block, and means providing for movement of one of said blocks longitudinally of the rod for tangentially abutting said balls against opposite sides of the taper when the flat surfaces of the blocks are resting upon and parallel to the flat surface of the object, the attachment of said balls being readily releasable and securable to permit the position of the balls to be adjusted for changing the position of the point of tangential abutment thereof with the taper.

7. A device of the character defined in claim 6, wherein said block is provided with a cylindrical opening in the flat surface thereof, and the attachment of said ball to said flat surface includes a cylindrical pin secured at one end to the ball and press-fitted into the opening at its opposite end.

8. As a subcombination, a body having a flat surface thereon, a first opening through the body with its axis extending parallel to said flat surface, a second opening connecting said first opening with the flat surface, a ball having a pin projecting therefrom and press fitted into said second opening for attaching said ball to the flat surface tangentially thereof, and a third opening connecting an outer portion of the body opposite said flat surface with the first opening at a point substantially opposite the connection of said first and second openings, whereby said pin may be punched from said second opening.

9. A device for measuring across the intersection of a taper with a flat surface of an object, comprising a straight cylindrical rod, a pair of blocks each having an opening therethrough to receive the rod and a flat surface parallel to the axis of the opening, the distance being the same in each block between the flat surface and a parallel plane tangential to the side of said opening adjacent said flat surface, a ball attached to the flat surface of each block in tangential relation thereto, and a set screw in each block for locking said rod in the opening of said block tangentially to said plane parallel to said flat surface.

10. A device for measuring across the intersection of a taper with a flat surface of an object, comprising a cylindrical rod, a pair of blocks on the rod, each of said blocks having a ball tangentially attached thereto of a size equal to the ball attached to the other block and the surface of each block surrounding and contiguous to the attachment of the ball thereto being flat, one of said blocks being rotatable about the rod for disposing its flat surface in the same plane as the flat surface of the other block and movable relatively to said other block for bringing said balls into tangential engagement with opposite sides of the taper when the flat surfaces of the blocks are resting upon the flat surface of the object, and means for locking said one block in position on the rod with its flat surface coplanar with the flat surface of the other block.

11. As a subcombination, a body having a flat surface on one side, a cylindrical opening extending through the body with its axis parallel to the plane of the flat surface, a tapped opening in the body connecting the side thereof opposite its flat surface with said cylindical opening and extending substantially transversely to the plane of said flat surface, a set screw received in said tapped opening, and a ball tangentially attached to said flat surface, said flat surface surrounding and being contiguous to the attachment of the ball thereto.

(References on following page)

References Cited in the file of this patent

UNITED STATES PATENTS

| | | |
|---|---|---|
| 2,178,293 | Wogeck | Oct. 31, 1939 |
| 2,419,134 | Hall | Apr. 15, 1947 |
| 2,431,826 | Pozar | Dec. 2, 1947 |
| 2,494,715 | Matthews | Jan. 17, 1950 |
| 2,638,676 | Callahan | May 19, 1953 |

FOREIGN PATENTS

| | | |
|---|---|---|
| 571,609 | Great Britain | Aug. 31, 1945 |

OTHER REFERENCES

American Machinist, pg. 384, Feb. 27, 1930.